United States Patent [19]

Ruhl

[11] Patent Number: 4,537,739
[45] Date of Patent: Aug. 27, 1985

[54] PRODUCTION OF MOLDED PLASTIC ARTICLES WITH ARTWORK THEREON

[75] Inventor: Gerald F. Ruhl, Greenville, Ohio

[73] Assignee: Replicap Products, Inc., Greenville, Ohio

[21] Appl. No.: 524,935

[22] Filed: Aug. 22, 1983

[51] Int. Cl.³ .......................... B29C 1/00; B29C 9/00; B29F 1/00

[52] U.S. Cl. .................... 264/247; 264/259; 264/313; 425/117; 425/126 R; 425/129 R

[58] Field of Search ................. 264/245–247, 264/259, 313; 118/213; 425/110, 117, 122, 127, 129 R, 126 R

[56] References Cited

U.S. PATENT DOCUMENTS

| | | | |
|---|---|---|---|
| 2,311,156 | 2/1943 | Casto | 264/259 |
| 2,811,744 | 11/1957 | Baldanza | 264/259 |
| 2,904,448 | 9/1959 | Sorg | 118/213 |
| 3,226,255 | 12/1965 | Cieniewicz et al. | 118/213 |
| 3,270,101 | 8/1966 | Jardine et al. | 264/247 |
| 3,427,688 | 2/1969 | Wilson | 425/127 |
| 3,654,062 | 4/1972 | Loew | 264/246 |
| 4,356,617 | 11/1982 | Coscia | 427/282 |
| 4,369,157 | 1/1983 | Conner | 264/246 |
| 4,442,056 | 4/1984 | Slepcevic | 425/110 |
| 4,466,787 | 8/1984 | Ragir et al. | 425/122 |

FOREIGN PATENT DOCUMENTS

| | | | |
|---|---|---|---|
| 50-22061 | 7/1975 | Japan | 264/246 |
| 6455 | of 1903 | United Kingdom | 427/282 |

*Primary Examiner*—Willard E. Hoag
*Attorney, Agent, or Firm*—Jacox & Meckstroth

[57] ABSTRACT

A mold includes relatively movable mold sections which defines multiple cavities and a space between two of the mold sections when the mold is open. The plurality of flexible strips each carrying a heat responsive transfer material are directed through the space and are clamped adjacent the mold cavities when the mold is closed. A plastics material is injected into the cavities to form the articles and to engage the transfer material to form predetermined artwork on the articles within the cavities. When the mold is open, the articles are removed, the strips are pulled through the space to advance new transfer material to the mold cavities, and the cycle is repeated. In one embodiment, the strips carry the transfer material at longitudinally spaced intervals in the form of the desired artwork, and in another embodiment, the artwork is formed by a template attached to the movable mold section adjacent the cavities.

9 Claims, 7 Drawing Figures

U.S. Patent    Aug. 27, 1985    Sheet 2 of 2    4,537,739
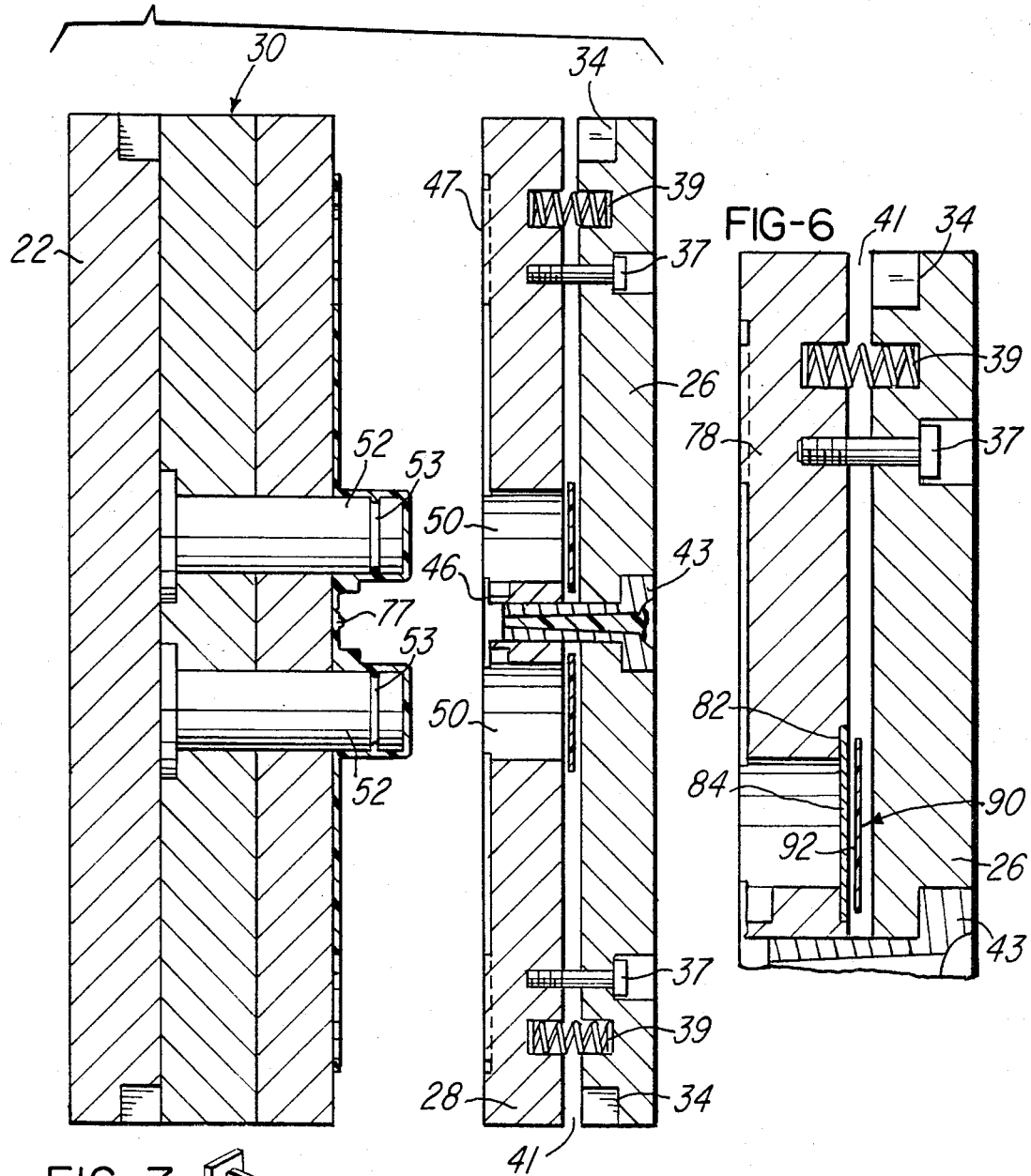
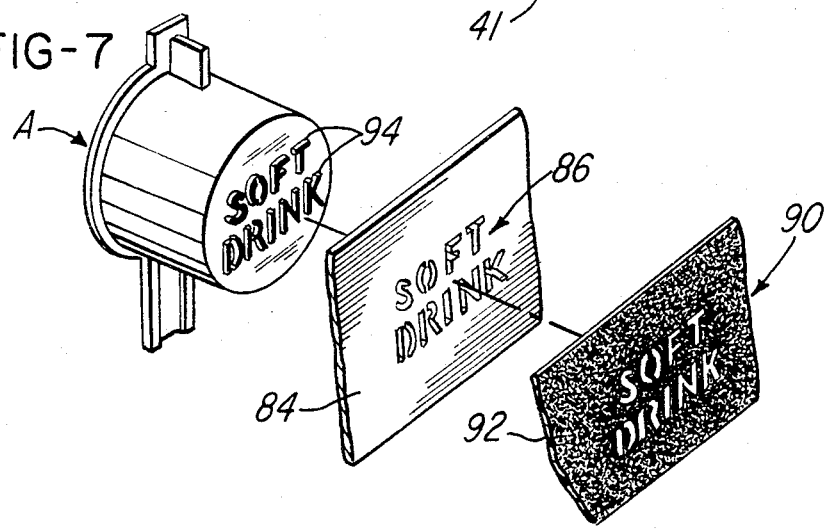

PRODUCTION OF MOLDED PLASTIC ARTICLES WITH ARTWORK THEREON

BACKGROUND OF THE INVENTION

In the production of molded plastic products or articles, it is frequently desirable to decorate or apply a transfer of artwork to each article. Usually, the molded plastic articles are successively passed through a decorating machine as a secondary operation where a heat responsive decorating material is transferred from a carrier ribbon or strip to each article by means of heat and a pressure die which corresponds to the desired artwork. The carrier strip of transfer material is longitudinally advanced from a supply roll while each article is being loaded into the decorating machine, and the scrap carrier strip is rewound onto a spool or directed into a scrap container.

It is apparent that the cost of producing molded plastic articles with predetermined decoration or other artwork, is significantly increased by the secondary operation for applying the artwork, especially when an operator is required for successively loading the articles into the decorating machine. While it has been proposed to insert transfer elements into the mold cavities when the mold is open and prior to injecting the plastics material, this manual operation of inserting the elements significantly increases the cycle time of the molding operation which adds to the cost of producing the articles and also requires the operator to place his fingers close to the hot mold components or sections.

SUMMARY OF THE INVENTION

The present invention is directed to an improved method and apparatus for automatically decorating or applying artwork to molded plastic articles as the articles are formed in the mold cavities and without increasing the cycle time of the molding operation. Thus the automatic application of the artwork within the mold and during the molding operation in accordance with the invention significantly reduces the cost of producing decorated plastic articles by eliminating any secondary operation for applying the artwork to the molded articles.

In accordance with one embodiment of the invention, decorated plastic articles are molded within a mold having relatively movable mold sections defining at least one cavity and between which a gap or space is formed when the mold is open. A strip carrying a heat responsive transfer material is supplied from a roll and longitudinally advanced through the space when the mold is open to position the transfer material adjacent the mold cavity. When the mold is closed, the strip is clamped between the two mold sections. When the plastics material fills the mold cavity, the material contacts the transfer material which transfers from the carrier strip to the article to form the desired artwork on the article. The transfer material may be applied to the carrier ribbon or strip in the form of the desired artwork or the carrier strip may carry a continuous layer of transfer material which is applied to the article through a thin metal template mounted on the movable mold section and defining the artwork.

Other features and advantages of the invention will be apparent from the following description, the accompanying drawings and the appended claims.

BRIEF DESCRIPTION OF THE DRAWINGS

FIG. 5 is a somewhat diagrammatic vertical section of the mold shown in FIG. 1 and in the open position;

FIG. 6 is a fragmentary section of a mold constructed in accordance with a modification of the invention; and FIG. 7 is a perspective view of a portion of a template used in the mold embodiment shown in FIG. 6 and showing its position relative to a molded article and a strip of transfer material.

DESCRIPTION OF THE PREFERRED EMBODIMENTS

Figure 1:
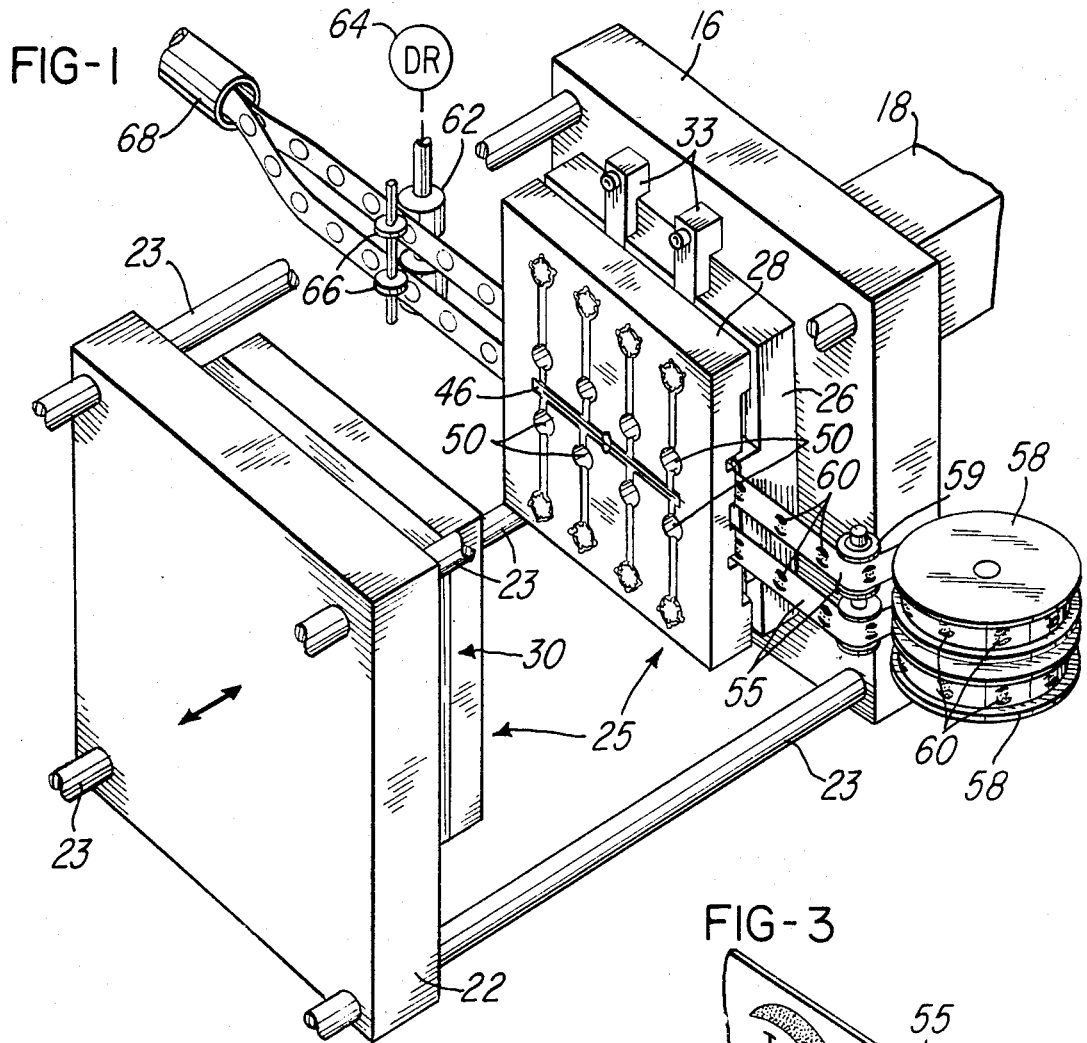
FIG. 1 is a perspective view of molding apparatus constructed for automatically applying artwork within the mold in accordance with the invention.

The molding apparatus illustrated in FIG. 1 includes a stationary vertical platen 16 having a center opening (not shown) through which molten plastics material is directed from a screw extruder 18 constructed in a conventional manner. The platen 16 of the press is opposed by a movable vertical platen 22 slidably supported by set of four guide rods 23 anchored to the platen 16. The platen 22 is moved horizontally on the guide rods 23 by the operation of a hydraulic cylinder or mechanical actuator (not shown) for opening and closing a mold 25 supported between the platens 16 and 22. The mold 25 includes a base plate or section 26, a movable plate or section 28 and a closure section 30 which is formed by two plates secured to the platen 22 for horizontal movement therewith.

The base plate or section 26 of the mold 25 is rigidly secured to the platen 16 by a set of upper and lower clamping blocks 33 which extend into corresponding recesses 34 (FIG. 5), and the mold section 26 supports the movable section 28 by a set of fasteners 37 (FIG. 5) threaded into the mold section 28 and slidable within corresponding bores in the mold section 26. A set of compression springs 39 are confined within opposing recesses within the mold sections 26 and 28 and normally bias the mold section 28 from the mold section 26 to form a gap or space 41 of approximately 0.020 inch. A sprue bushing 43 is pressed into the mold plate 26 and is slidably received within a bore in the mold plate 28. The bushing 43 defines a center passage through which molten plastics material flows from the extruder 18 into a runner passage 46 formed within the face 47 of the mold plate or section 28.

The mold section 28 of the mold 25 also defines multiple cavities 50 which are interconnected by the runner passage 46. The mold section 30 supports a corresponding plurality of core pins 52 which move with the mold section 30 into the corresponding cavities 50 when the mold 25 is closed. Each of the core pins 52 is provided with a circumferential external groove 53.

Figure 2:
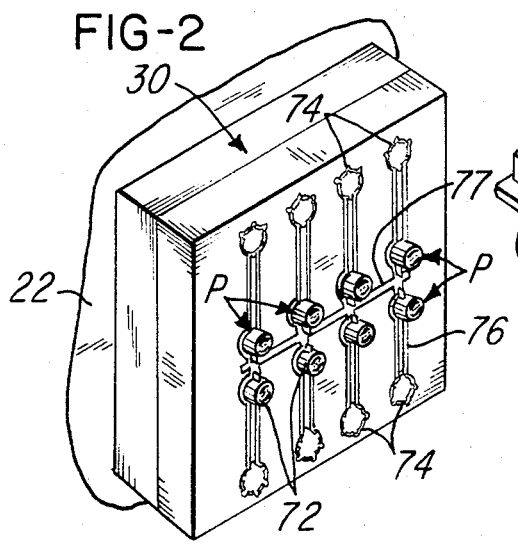
FIG. 2 is a perspective view of a mold section and showing a series of articles molded in the apparatus shown in FIG. 1 and with decorating artwork applied to the articles within the mold.

Referring to FIGS. 1 and 2, a pair of continuous ribbons or strips 55 are supplied from corresponding supply rolls 58 and are directed around corresponding guide rolls 59 horizontally through the gap or space 41 defined between the mold sections 26 and 28 when the mold 25 is open. Each of the strips 55 is preferably made from a plastics film material such as a polyester and carries longitudinally spaced transfers 60 corresponding to the desired characters or design or other artwork formed by a heat responsive transfer ink or material such as commonly used for hot stamping of molded plastic parts. The longitudinal spacing of the transfers 60 on each ribbon or strip 55 corresponds to the lateral spacing of the cavities 50 within each horizontal row in the mold section 28.

After the strips 55 pass through the space 41 between the mold sections 26 and 28, the strips engage a feed roller 62 (FIG. 1) which is rotated in predetermined increments by a stepping or indexing drive motor 64. The feed roller 62 has a high friction outer surface, and a pair of freely rotatable resilient wheels 66 press the strips 55 firmly against the outer surface of the feed roll 62. From the feed roll 62, the strips 55 are directed into a suction tube 68 extending from a vacuum container (not shown).

Figure 4:
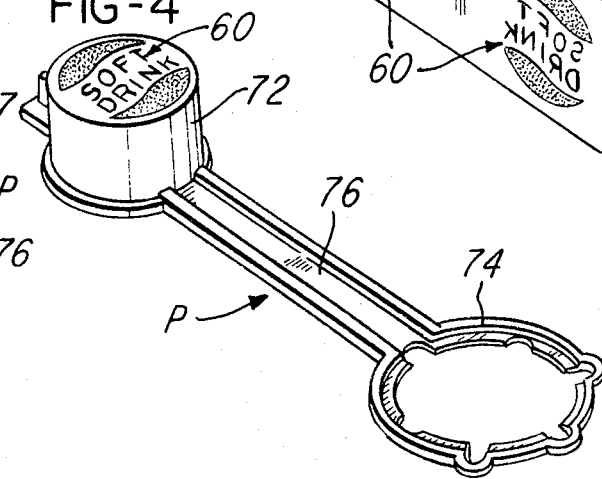
FIG. 4 is a perspective view of one of the plastic articles molded and decorated in the apparatus shown in FIG. 1.

FIG. 4 illustrates one of the parts P which is molded and decorated within the mold 25 in accordance with the invention. The part P is a captive sanitary cap used for covering a beverage tank valve and is similar to the cap disclosed in U.S. Pat. No. Des. 260,373 which issued to the assignee of the present invention. The cap includes a cup portion 72 which is integrally connected to a retaining ring portion 74 by a connector or link portion 76. However, it is to be understood that the specific part P illustrated in the drawings is shown only as an example of a part which may be molded and decorated with apparatus constructed in accordance with the invention.

In operation of the molding apparatus described above in connection with FIGS. 1-5, when the mold 25 is closed by movement of the mold section 30 into engagement with the mold or section 28, the mold section 28 is pressed against the mold section 28 so that the ribbons or strips 55 are clamped between the mold sections 26 and 28 with a transfer 60 located at the base or inner end of each cavity 50. As the molten plastics material is injected through the sprue bushing 43 and runner 46 and fills up each cavity 50 around corresponding core pin 52, the plastics material engages the corresponding transfer 60. The preformed artwork transfers from the strip 55 as a result of the heat and pressure and becomes bonded to the outer end wall of the cup portion 72 of the part P, as shown in FIGS. 2 and 4. When the mold 25 is opened (FIGS. 2 and 5), the parts P move from the corresponding cavities 50 and remain with the core pins 52. As shown in FIG. 2, the eight parts P are integrally connected by a runner 78 which forms within the runner passage 46. The runner 77 is automatically sheared from the parts P as the mold opens, and the parts are stripped from the core pins 52.

When the mold 25 opens, the springs 39 shift the mold plate or section 28 away from the mold plate or section 26 to form the gap or space 41 between the mold sections. As soon as the strips 55 are unclamped or released, the drive 64 is actuated to advance the strips 55 and present another set of transfers 60 to the ends of the mold cavities 50. The molding cycle is then repeated to form another set of molded plastic parts each carrying the artwork formed by the transfers 60.

Referring to FIGS. 6 and 7 which show a modification of a molding and decorating operation in accordance with the invention, the mold plate or section 26 supports a mold plate or section 78 which is constructed substantially the same as the mold section 28 but includes a laterally extending flat recess 82 for receiving a flat template 84 preferably formed from spring steel having a thickness of about 0.020 inch. The template 84 has artwork 86 for each of the mold cavities, and the artwork is cut into the template in the form of a stencil. The template 84 is retained within the recess 82 by suitable fasteners (not shown) which permit the template to be inserted and removed through the gap or space 41 when the mold is open and the fasteners are released.

Carrier ribbon or strip 90 is directed through the space 41 between each template 84 and the mold section 26 and carries a continuous coating 92 of heat responsive transfer material. When the mold is closed and the strip 90 is clamped between the template 82 and the mold section 26, the transfer material is exposed through the stencil artwork 86 at the base of each mold cavity 50. Thus when the molten plastics material is injected into the cavities, the material flows into the stencil artwork 86 at the bottom of each cavity and contacts the transfer material on the strips 90. When the mold is opened, each part or article A is provided with raised lettering or artwork 94 having its top or outer surface colored or decorated by the transfer material. The lettering or artwork is raised by the thickness of the template 84.

From the drawings and the above description, it is apparent that the method and apparatus of the invention for producing decorated molded plastic parts or articles, provide desirable features and advantages. For example, it is apparent that both embodiments of the invention eliminate the need for a secondary operation to decorate or apply artwork to molded plastic articles and perform the decorating operation within the mold as the articles are formed. As a result, there is no increase in the cycle time of the molding operation, and the cost of producing the decorated articles is substantially reduced over conventional methods of production.

Figure 3:
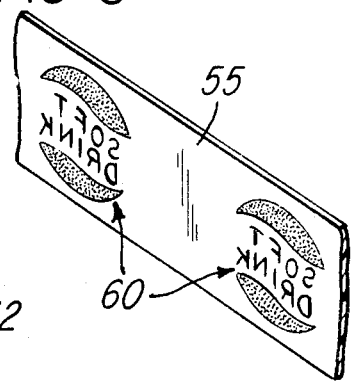
FIG. 3 is a perspective view of a fragmentary portion of a transfer strip used in the apparatus shown in FIG. 1.

It is also apparent that the transfers 60 shown in FIG. 3 may be formed with multiple color artwork applied at longitudinally spaced intervals to each carrier ribbon or strip 55. Thus each transfer strip 55 is custom made for the specific articles being molded. In the embodiment described in connection with FIGS. 6 and 7, the transfer ribbon or strip 90 may be a standard commercially available transfer strip in the desired color, and the interchangeable template 84 is custom made for the specific articles being molded with the desired artwork 86. For higher volume production, the lower cost standard or plain transfer ribbon or strip 90 and the cost of the template 84 provide for minimizing the cost for producing decorated molded articles. While not illustrated in the drawings, the transfers 60 on the strips 55 or the clear spaces on the strips after the transfers are removed are sensed by an optical system which controls the drive 64 to obtain precise linear advancement of the strips 55 after the mold 25 is opened and the mold plate 28 is released.

While the method and forms of molding apparatus herein described constitute preferred embodiments of the invention, it is to be understood that the invention is not limited to the precise method and forms of apparatus described, and that changes may be made therein without departing from the scope and spirit of the invention as defined in the appended claims.

The invention having thus been described, the following is claimed:

1. A method of producing articles of molded plastics material with each article having thereon a decorative coating according to predetermined artwork, comprising the steps of forming on a first mold section and a second mold section corresponding surfaces cooperating to define a primary portion of at least one mold cavity corresponding to the shape of the article, positioning adjacent the second mold section a mold plate having a generally flat surface defining a secondary portion of the cavity and substantially coextensive with the cavity, supporting the first and second mold sections for relative movement between open and closed positions, supporting the second mold section and the mold plate for relative movement between a clamped position and a released position defining a clearance space therebetween, providing an elongated flexible carrier strip releasably supporting a layer of heat responsive transfer material, directing the carrier strip through the clearance space and along a path adjacent the mold plate surface and the cavity, clamping the carrier strip between the mold plate surface and the second mold section when the mold plate and the second mold secton are in the clamped position, injecting a molten plastics material into the mold cavity remote from the surface of the mold plate and into contact with the layer of transfer material on the carrier strip adjacent the mold plate surface to form an article within the cavity and to transfer a portion of the layer of transfer material from the carrier strip to the article while the corresponding portion of the carrier strip remains in contact with the generally flat mold plate surface, and pulling the carrier strip longitudinally through the clearance space when the mold plate and the second mold section are in the released position to advance the carrier strip and position another portion of the layer of transfer material adjacent the mold cavity.

2. A method as defined in claim 25 and including the step of mounting a thin template having an opening corresponding to the artwork on the second mold section adjacent the mold cavity, and advancing the strip of transfer material between the template and the mold plate when the mold plate and the second mold section are in the released position.

3. A method as defined in claim 25 wherein the mold sections have a plurality of cavities therein, and simultaneously advancing plurality of separate carrier strips through the space between the mold plate and the second mold section in the released position and into positions adjacent the cavities.

4. Apparatus for producing articles of molded plastics material with each article having thereon a decorative coating according to predetermined artwork, comprising a mold including a first mold section and a second mold section having corresponding surfaces cooperating to define a portion of at least one mold cavity corresponding to the shape of the article, a mold plate disposed adjacent said second mold section and having a generally flat surface also defining a portion of said cavity and substantially coextensive with said cavity, means supporting said first and second mold sections for relative movement between open and closed positions, means supporting said second mold section and said mold plate for relative movement between a clamped position and a released position defining a clearance space therebetween, an elongated flexible carrier strip releasably supporting a layer of heat responsive transfer material, means for directing said carrier strip through said clearance space and along a path adjacent said mold plate surface and said cavity, said carrier strip being clamped between said mold plate surface and said second mold section when said mold plate and said second mold section are in said clamped position, means for injecting a molten plastics material into said mold cavity remote from said surface on said mold plate and into contact with said layer of transfer material on said carrier strip adjacent said mold plate surface to form an article within said cavity and to transfer a portion of said layer of transfer material from said carrier strip to the article while the corresponding portion of said carrier strip remains in contact with said mold plate surface, and means for pulling said carrier strip longitudinally through said clearance space when said mold plate and said second mold section are in the said released position to advance said carrier strip and position another portion of the said layer of transfer material adjacent said mold cavity.

5. Apparatus as defined in claim 4 wherein one of said mold sections is supported by said mold plate for movement between said clamped position securing said strip and said released position defining said space, and a set of springs normally urging said one mold section towards said released position.

6. Apparatus as defined in claim 4 wherein said carrier strip releasably supports longitudinally spaced transfers each corresponding to the desired artwork.

7. Apparatus as defined in claim 6 wherein said mold defines a plurality of said cavities aligned in a row, and said pulling means is effective to pull a sufficient length of said strip for locating corresponding said transfers in alignment with said cavities while said mold sections are in said open position.

8. Apparatus for producing articles of molded plastics material with each article having thereon a decorative coating according to predetermined artwork, comprising a mold including a first mold section and a second mold section having corresponding surfaces cooperating to define a portion of at least one mold cavity corresponding to the shape of the article, a mold plate disposed adjacent said second mold section and having a generally flat surface also defining a portion of said cavity and substantially coextensive with said cavity, a thin template mounted on said second mold section and having a surface also defining a portion of said cavity, said template defining an opening corresponding to said artwork, means supporting said first and second mold sections for relative movement between open and closed positions, means supporting said second mold section and said mold plate for relative movement between a clamped position and a released position defining a clearance space therebetween, an elongated flexible carrier strip releasably supporting a layer of heat responsive transfer material, means for directing said carrier strip through said clearance space and along a path between said template and said mold plate surface, said carrier strip being clamped between said mold plate surface and said second mold template when said mold plate and said second mold section are in said clamped position, means for injecting a molten plastics material into said mold cavity remote from said surface on said mold plate and outwardly through said opening within said template into contact with said layer of transfer material covering said opening to form an article within said cavity and to transfer a portion of said layer of transfer material from said carrier strip to the article while the corresponding portion of said carrier strip remains in contact with said mold plate surface, and means for pulling said carrier strip longitudinally through said clearance space when said mold plate and said second mold section are in the said released position to advance said carrier strip and position another portion of the said layer of transfer material to said opening within said template.

9. Apparatus as defined in claim 8 wherein said strip comprises a substantially continuous said layer of said heat responsive transfer material disposed for contacting said template when said mold sections are moved to said closed position.

* * * * *

UNITED STATES PATENT AND TRADEMARK OFFICE
CERTIFICATE OF CORRECTION

PATENT NO. : 4,537,739
DATED : August 27, 1985
INVENTOR(S) : Gerald F. Ruhl

It is certified that error appears in the above-identified patent and that said Letters Patent are hereby corrected as shown below:

Column 5, claim 2, line 41, "25" should be --1--.

Column 5, claim 3, line 48, "25" should be --1--.

Signed and Sealed this

Twenty-ninth Day of October 1985

[SEAL]

Attest:

DONALD J. QUIGG

Attesting Officer

Commissioner of Patents and
Trademarks—Designate